United States Patent [19]

Maruyama et al.

[11] Patent Number: 5,500,767
[45] Date of Patent: Mar. 19, 1996

[54] OBJECTIVE LENS AND METHOD OF MEASURING ITS PERFORMANCE

[75] Inventors: Koichi Maruyama; Syun'itirou Wakamiya; Makoto Iwaki; Masahiro Oono, all of Tokyo, Japan

[73] Assignee: Asahi Kogaku Kogyo Kabushiki Kaisha, Tokyo, Japan

[21] Appl. No.: 272,616

[22] Filed: Jul. 11, 1994

Related U.S. Application Data

[63] Continuation of Ser. No. 877,233, May 1, 1992, abandoned.

[30] Foreign Application Priority Data

May 2, 1991 [JP] Japan ................................. 3-202604

[51] Int. Cl.$^6$ .............................. G02B 9/00; G02B 9/62; G01B 11/00
[52] U.S. Cl. ...................... 359/642; 359/756; 359/761; 359/754; 356/124; 356/359
[58] Field of Search ................................. 356/124, 359, 356/360; 359/350, 355, 356, 357, 642, 754, 756, 761

[56] References Cited

U.S. PATENT DOCUMENTS

| | | | |
|---|---|---|---|
| 3,035,490 | 5/1962 | Tibbetts | 359/355 |
| 3,467,462 | 9/1969 | Kazamaki et al. | 359/357 |
| 3,490,825 | 1/1970 | Takahashi | 359/357 |
| 3,915,547 | 10/1975 | Scidmore et al. | 359/357 |
| 4,050,779 | 9/1977 | Fleischman | 359/355 |
| 4,200,352 | 4/1980 | Yuta | 359/355 |
| 4,641,962 | 2/1987 | Sueda et al. | 356/124 |
| 4,711,576 | 12/1987 | Ban | 356/359 |
| 4,770,477 | 9/1988 | Shafer | 359/355 |
| 4,958,931 | 9/1990 | Tatian | 356/360 |
| 5,052,763 | 10/1991 | Singh et al. | 359/355 |
| 5,142,409 | 8/1992 | Hanzawa et al. | 359/355 |
| 5,144,475 | 9/1992 | Hayashi | 359/355 |
| 5,159,492 | 10/1992 | Hayashi | 359/661 |
| 5,175,594 | 12/1992 | Campbell | 356/124 |

*Primary Examiner*—James C. Housel
*Assistant Examiner*—Christopher Y. Kim
*Attorney, Agent, or Firm*—Sughrue, Mion, Zinn, Macpeak & Seas

[57] ABSTRACT

An objective lens is corrected for spherical aberration at both an operating wavelength and a measurement wavelength, such that the amount of spherical aberration to develop at the operating wavelength is substantially equal to the amount of spherical aberration to develop at a measuring wavelength. The method of lens performance measurement then uses a light source emitting at a wavelength different from the operating wavelength.

6 Claims, 7 Drawing Sheets

FIG. 2
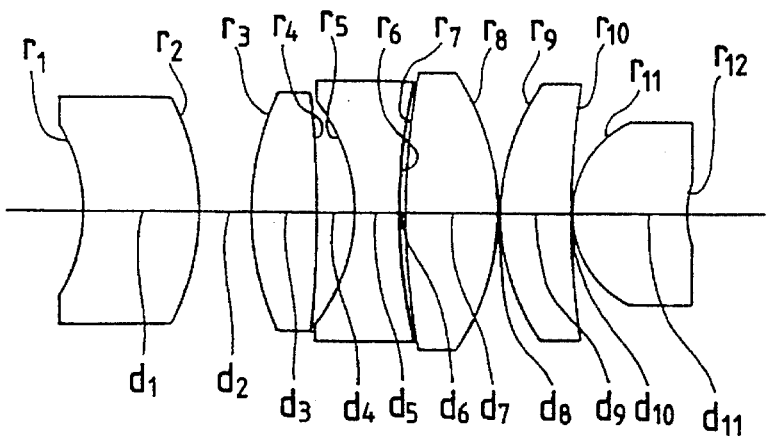
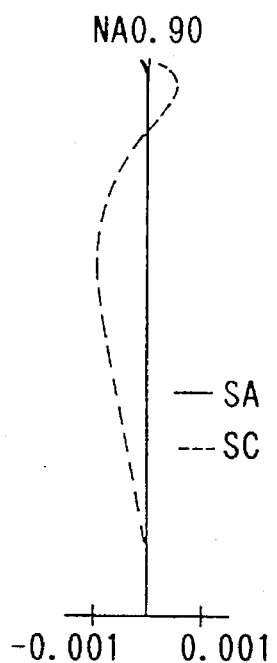
FIG. 3A
NA0.90
— SA
--- SC
-0.001   0.001
SPHERICAL ABERRATION
SINE CONDITION
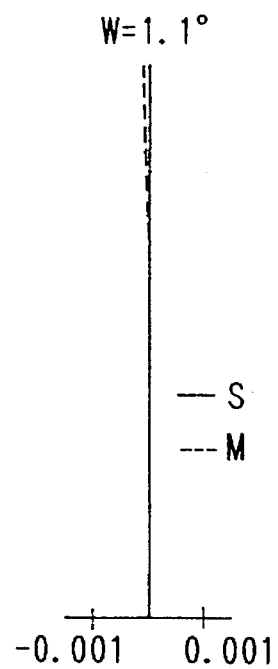
FIG. 3B
W=1.1°
— S
--- M
-0.001   0.001
ASTIGMATISM

SAGITTAL

MERIDIONAL

SPHERICAL ABERRATION
SINE CONDITION

NA0.90

— SA
--- SC

-0.001   0.001

SPHERICAL ABERRATION
SINE CONDITION

W=1.1°

— S
--- M

-0.001   0.001

ASTIGMATISM

SPHERICAL ABERRATION
SINE CONDITION

OBJECTIVE LENS AND METHOD OF MEASURING ITS PERFORMANCE

This is a Continuation of Application Ser. No. 07/877,233 filed May 1, 1992, now abandoned.

BACKGROUND OF THE INVENTION

This application is based on and claims priority from Japanese Application No. HEI 3-202604 filed May 2, 1991, the disclosure of which is incorporated herein by reference.

The present invention relates to an objective lens to be used with optical disk systems. More particularly, the present invention relates to an objective lens suitable for performance measurement at wavelengths different from the operating wavelength, as well as a method of measuring the performance of this objective lens.

Measurements for the testing of lens performance are desirably performed in an environment that is either identical or close to the actual environment in which the lens of interest is to be used. Hence, when one is to perform measurements with rays of light being launched into a lens, it is preferred to use a light source that emits light at what will be the operating wavelength after the lens is installed in the system. However, some lenses are adapted to be used at wavelengths outside the visible range. If the performance of such lenses is measured using rays of light at their operating wavelength which is outside the visible range, the efficiency of measurement is undesirably low. In such a case, it would be desirable to perform a measurement using a light source that emits at a wavelength in the visible range which is different from the operating wavelength at which the lens is to be used.

Conventional objective lenses for use with optical disks are intended to be used either at a single wavelength or within the range of wavelength variations of a light source that occur during operation. Thus, if their performance is measured using a light source that emits at a much different wavelength than the operating wavelength, an undesirably large error will occur. If there is a large spherical aberration at the measuring wavelength, increased errors of measurement are liable to occur when aberrations are measured with an interferometer.

SUMMARY OF THE INVENTION

The present invention has been achieved under the circumstances described above, and it is an object of the invention to provide an objective lens that will experience a smaller measurement error even if the light source for measurement emits at a wavelength different from the actual operating wavelength of the lens.

It is a further object of the present invention to provide a method of measuring the performance of such an objective lens.

These and other objects are achieved by an objective lens that is corrected for spherical aberration in such a way that the amount of spherical aberration to develop at the operating wavelength is substantially equal to the amount of spherical aberration to develop at a measuring wavelength different from the operating wavelength.

The performance measurement method of the present invention uses a light source emitting at a wavelength different from the intended operating wavelength of the lens.

BRIEF DESCRIPTION OF THE DRAWINGS

The invention will be more clearly understood from the following description in conjunction with the accompanying drawings, wherein:

FIG. 2 is a simplified cross-sectional view of an objective lens according to a first embodiment of the present invention (Example 1);

FIGS. 3A and 3B are graphs plotting the spherical aberration and astigmatism curves of the objective lens of Example 1 at the operating wavelength;

DETAILED DESCRIPTION OF THE PREFERRED EMBODIMENTS

Two examples of the present invention are described below with reference to the accompanying drawings. The objective lenses of both examples are to be used with an optical disk system, such as a laser disk system for High Definition Television (HDTV) sets, which requires more data to construct a single image frame than conventional laser disk systems.

Recording density is in inverse proportion to the square of the spot diameter of a writing laser beam, which in turn is proportional to the numerical aperture (N.A.) and is inversely proportional to the operating wavelength. Hence, the objective lenses of the two examples have a greater numerical aperture (N.A.) than prior art lenses in order to improve the recording density, and are designed to be operable in the ultraviolet range.

On the other hand, at the stage of lens manufacture, measurements are difficult to perform if a light source is used that emits in the operating ultraviolet range. To overcome this difficulty, a He-Ne laser is employed that outputs coherent visible light and which is yet inexpensive.

Under these circumstances, the objective lenses of the two examples are corrected for spherical aberration both at 351 nm (outside the visible range) which is the wavelength of a light source for system operation, and at 633 nm (in the visible range) which is the wavelength of a light source for performance measurement. By reducing the variations in spherical aberration due to differences in wavelength, the performance of a lens of interest can be measured with high precision, since it is effectively corrected for spherical aberration.

The amount of aberrational variations due to lens machining errors remains substantially constant in spite of changes in wavelength, so adjustment to satisfactory performance can be achieved even at wavelengths differing from the operating wavelength. Performance parameters to be actually measured include eccentric coma, spherical aberration and astigmatism, and they can be adjusted on the basis of the results of measurements.

Figure 1:
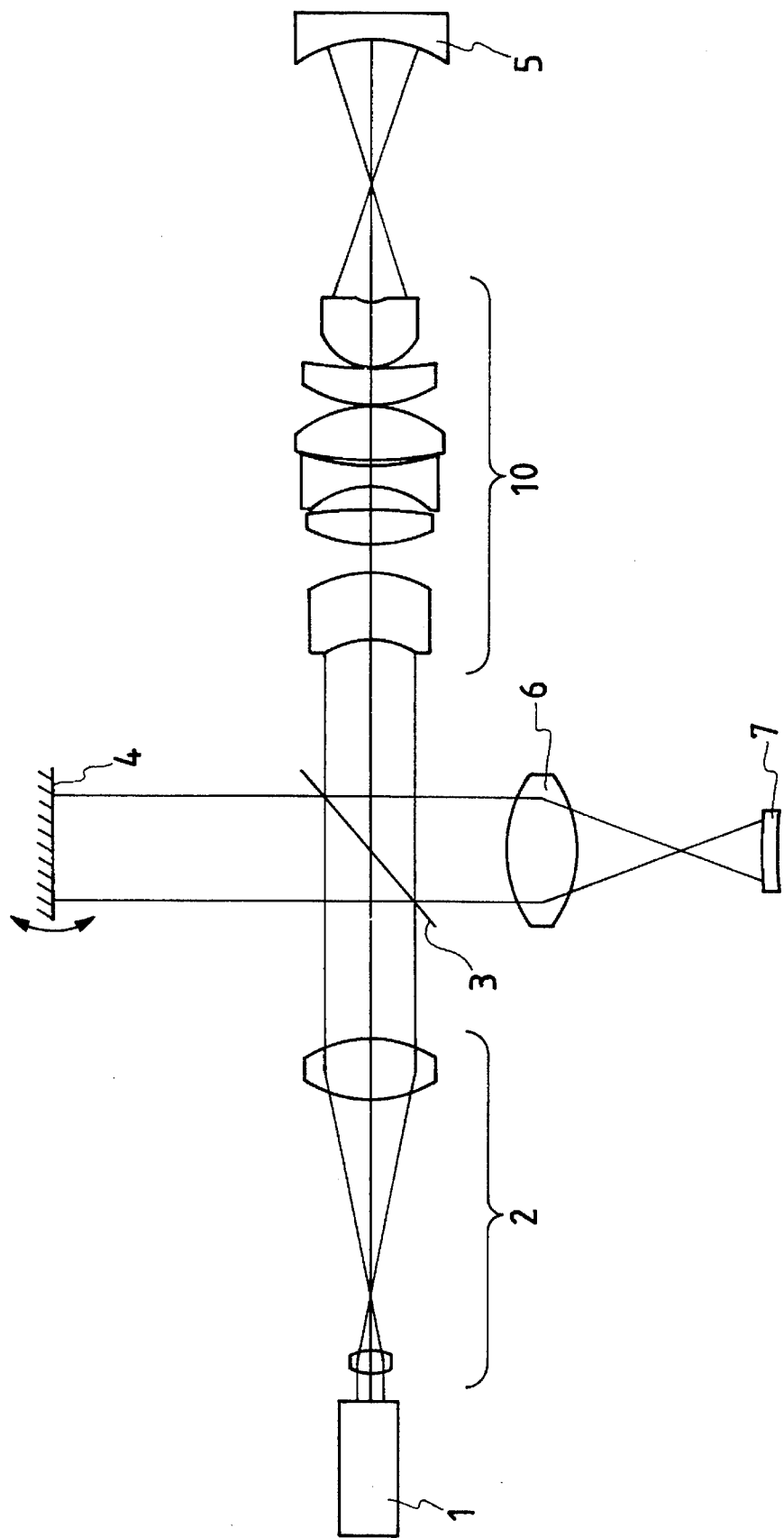
FIG. 1 is a schematic diagram showing a measurement system in which an objective lens according to the invention is used.

FIG. 1 shows a preferred embodiment of an optical system for lens measurement, where a laser light from an He-Ne laser 1 is expanded and collimated by a beam expander 2. The He-Ne laser 1 emits laser light with a wavelength different from an operating wavelength of the above-described objective lens generally designated by reference numeral 10, which represents the lens to be measured. The collimated light is separated into two beams by a half-mirror 3. The component reflected by the half-mirror 3 is further reflected by a reference mirror 4, whereas the component transmitted through the half-mirror 3 passes through the objective lens 10 whereupon it is reflected by a concave mirror 5.

The beams reflected from the reference mirror 4 and the concave mirror 5 return to the half-mirror 3, where they are superimposed and directed to an imaging lens 6. The imaging lens 6 focuses the superimposed image to form an interference pattern on an image sensor 7. The output of the image sensor 7 is processed by an image processing circuit and displayed on a monitor, both of which are not shown in FIG. 1. Upon visual inspection of the mirror by an operator, the reference mirror 4 is titled to produce an interference fringe, thereby allowing for a spherical aberration of the objective lens 10 to be measured at the nonoperating wavelength.

EXAMPLE 1

FIG. 2 shows diagrammatically the objective lens of Example 1. Numerical data for the specific lens components are given in Table 1, in which NA denotes the numerical aperture, ω the half view angle, fB the back focus, λ the operating wavelength, r the radius of curvature, d the distance successive lens surfaces, Nd the refractive index at the d-line (588 nm), νd the Abbe number, and $N_{351}$ the refractive index at a wavelength of 351 nm.

Figures 4A, 4B:
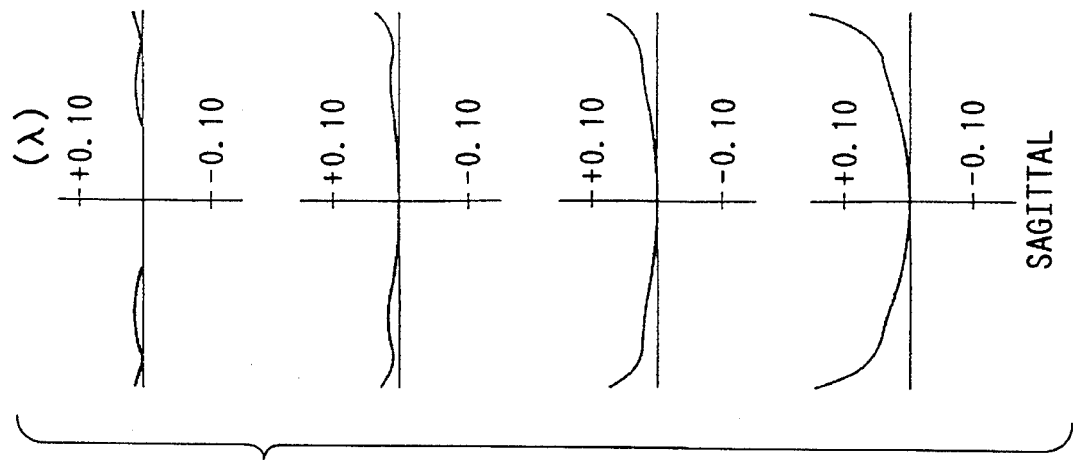
FIGS. 4A and 4B are graphs plotting the wavefront aberration curves for the objective lens of Example 1 at the operating wavelength.

FIGS. 3A and 3B show the spherical aberration (SA), sine condition (SC) and astigmatism (sagittal (S) and meridional (M))) at the wavelength of 351 nm. FIGS. 4A and 4B show the corresponding wavefront aberrations in both the meridional direction (FIG. 4A) and the sagittal direction (FIG. 4B). The vertical axis of each graph plots the amount of aberration as measured by wavelength (λ).

Figure 5:
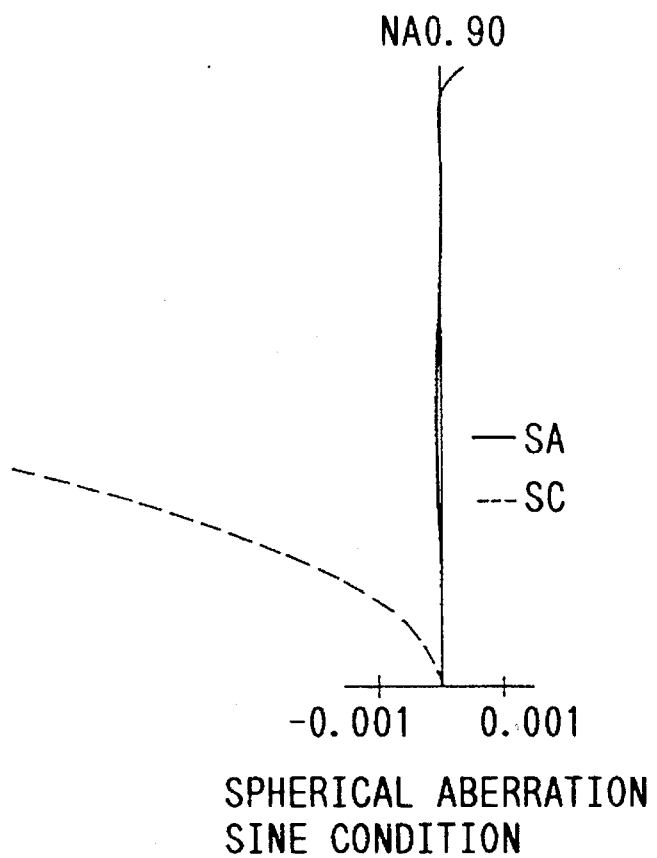
FIG. 5 is a graph plotting the spherical aberration and sine condition curves for the objective lens of Example 1 at the measuring wavelength.
Figure 6:
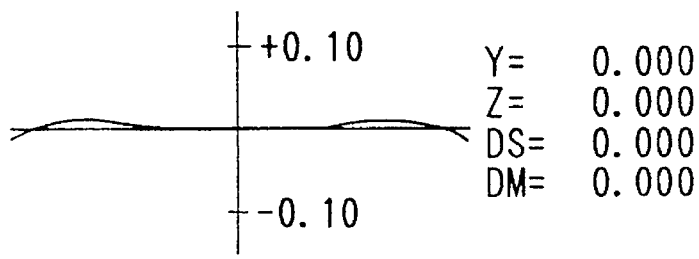
FIG. 6 is a graph plotting the wavefront aberration curve for the objective lens of Example 1 at the measuring wavelength.

FIG. 5 shows the spherical aberration and sine condition at the measurement wavelength of 633 nm, and FIG. 6 shows the corresponding on-axis wavefront aberration.

TABLE 1

| | NA = 0.90 | f = 4.00 | | ω = 1.1° | |
| | fb = 0.90 | | λ = 351 nm | | |
| Surface No. | r | d | Nd | vd | $N_{351}$ |
|---|---|---|---|---|---|
| 1 | −6.690 | 4.900 | 1.58913 | 61.2 | 1.61589 |
| 2 | −9.826 | 2.100 | — | | |
| 3 | 12.497 | 2.700 | 1.57501 | 41.5 | 1.61743 |
| 4 | −62.379 | 1.600 | — | | |
| 5 | −7.588 | 1.820 | 1.62004 | 36.3 | 1.67388 |
| 6 | 22.977 | 0.240 | — | | |
| 7 | 29.477 | 3.970 | 1.58913 | 61.2 | 1.61589 |
| 8 | −9.515 | 0.060 | — | | |
| 9 | 9.001 | 2.930 | 1.58913 | 61.2 | 1.61589 |
| 10 | 31.741 | 0.060 | — | | |
| 11 | 4.207 | 4.800 | 1.77250 | 49.6 | 1.81713 |
| 12 | 3.242 | — | — | | |

EXAMPLE 2

Figure 7:
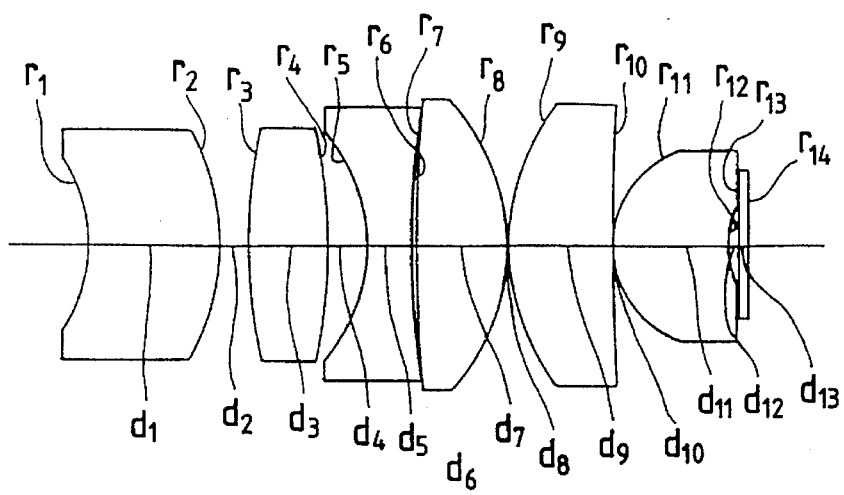
FIG. 7 is a simplified cross-sectional view of an objective lens according to a second embodiment of the present invention (Example 2)
Figure 8A:
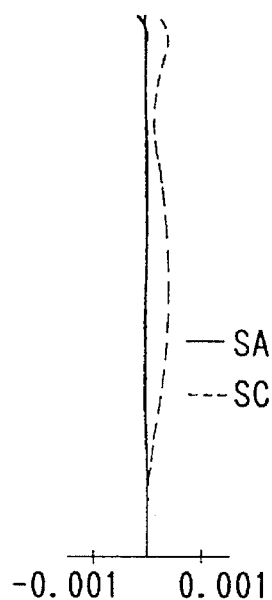
FIGS. 8A and 8B are graphs plotting the spherical aberration and astigmatism curves for the objective lens of Example 2 at the operating wavelength.
Figure 8B:
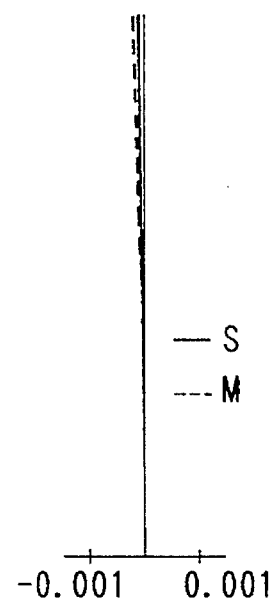
Figure 9A:
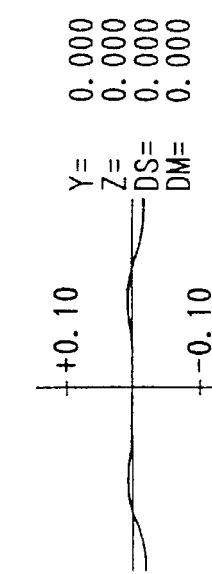
FIGS. 9A and 9B are graphs plotting the wavefront aberration curves for the objective lens of Example 2 at the operating wavelength.
Figure 9A:
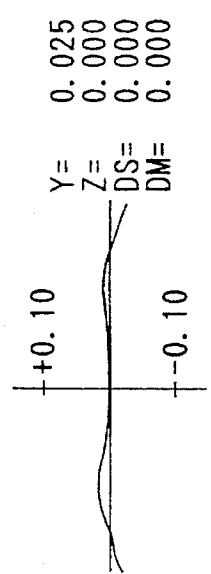
Figure 9A:
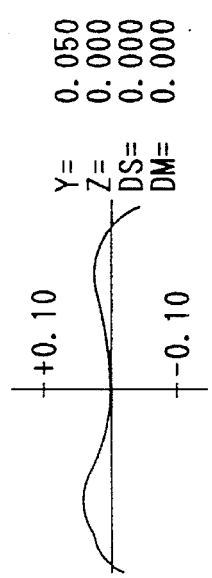
Figure 9A:
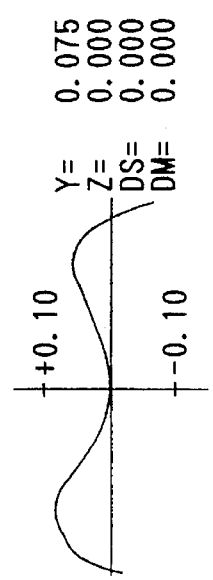
Figure 9B:
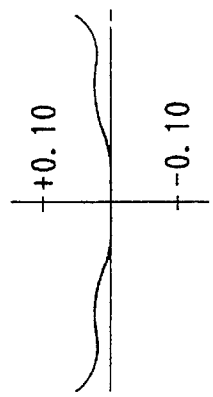
Figure 9B:
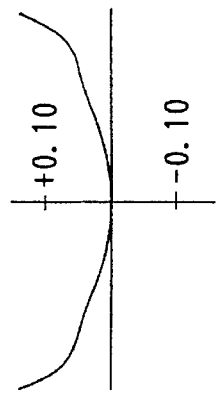

FIG. 7 shows diagrammatically the objective lens of Example 2. Numerical data for the specific lens components are given in Table 2. FIGS. 8A and 8B show the spherical aberration, sine condition and astigmatism at the wavelength of 351 nm, and FIGS. 9A and 9B show the corresponding wavefront aberrations in both the meridional and sagittal directions.

Figure 10:
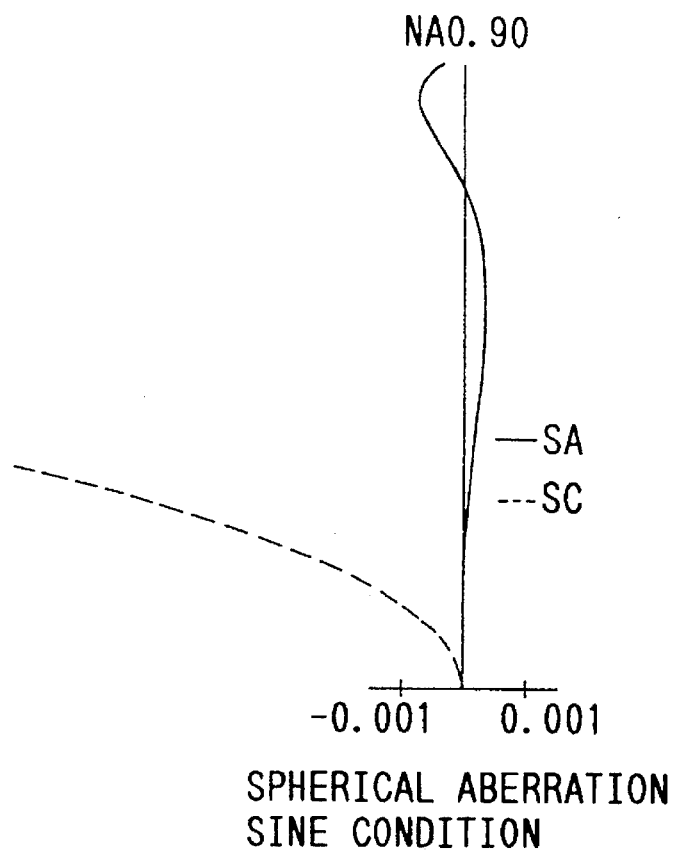
FIG. 10 is a graph plotting the spherical aberration and sine condition curves for the objective lens of Example 2 at the measuring wavelength.
Figure 11:
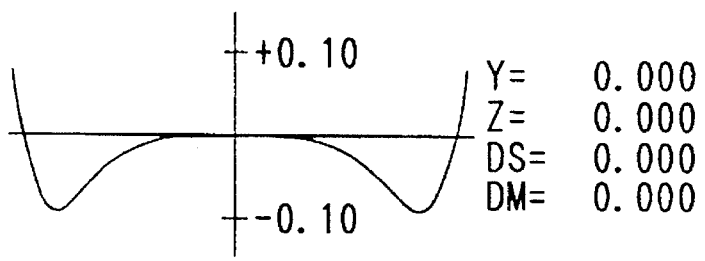
FIG. 11 is a graph plotting the wavelength aberration curve for the objective lens of Example 2 at the measuring wavelength.

FIG. 10 shows the spherical aberration and sine condition at the measurement wavelength of 633 nm, and FIG. 11 shows the corresponding on-axis wavefront aberration.

TABLE 2

| | NA = 0.90 | f = 4.00 | | ω = 1.1° | |
| | fb = 0.54 | | λ = 351 nm | | |
| Surface No. | r | d | Nd | vd | $N_{351}$ |
|---|---|---|---|---|---|
| 1 | −6.892 | 5.730 | 1.59551 | 39.2 | 1.64249 |
| 2 | −10.450 | 1.230 | — | | |
| 3 | 23.860 | 3.390 | 1.53172 | 48.9 | 1.56376 |
| 4 | −23.860 | 1.700 | — | | |
| 5 | −7.241 | 1.810 | 1.62004 | 36.3 | 1.67388 |
| 6 | 38.129 | 0.222 | — | | |
| 7 | 63.688 | 3.900 | 1.58313 | 59.4 | 1.61064 |
| 8 | −9.260 | 0.060 | — | | |
| 9 | 10.144 | 4.350 | 1.58313 | 59.4 | 1.61064 |
| 10 | 65.187 | 0.060 | — | | |
| 11 | 4.460 | 4.870 | 1.77250 | 49.6 | 1.81713 |
| 12 | 3.982 | 0.440 | — | | |
| 13 | ∞ | 0.436 | 1.51633 | 64.1 | 1.53844 |
| 14 | ∞ | — | — | | |

As described above, the present invention offers the advantage of enabling the accurate measurement of lens performance even if the operating wavelength is not suitable for measurement, where it is necessary to perform the measurement using a light source that emits at a wavelength other than the operating wavelength. Even under this condition, the performance of an objective lens can be measured with high precision by correcting the lens for spherical aberration at both the operating and measuring wavelengths.

What is claimed is:

1. An objective lens comprising a plurality of lens components wherein said objective lens has an amount of spherical aberration developed at a first wavelength in the ultraviolet wavelength range which is substantially equal to an amount of spherical aberration developed at a second wavelength in the visible wavelength range wherein said second wavelength is the wavelength of a He-Ne laser beam.

2. An objective lens as set forth in claim 1, wherein said second wavelength is about 633 nm.

3. An objective lens as set forth in claim 1, wherein said wavelength of said He-Ne laser beam is for performance measurement of said objective lens.

4. A method of measuring the performance of an objective lens comprising:

provide a He-Ne laser source and a light source having a wavelength outside a visible wavelength range;

passing light from said He-Ne laser source as a measuring wavelength in the visible wavelength range through an objective lens having lens means having an amount of spherical aberration developed at an operating wavelength outside the visible wavelength range which is substantially equal to an amount of spherical aberration developed at said measuring wavelength in the visible wavelength range; and measuring the performance of said lens by using said light at the measuring wavelength in the visible range.

5. A method of measuring the performance of an objective lens as set forth in claim 4 wherein the operating wavelength is in the ultraviolet ray region.

6. A method of measuring the performance of an objective lens as set forth in claim 4 wherein said measuring wavelength of said He-Ne laser source is about 633 nm.

* * * * *